(12) United States Patent
Mersch et al.

(10) Patent No.: US 7,805,888 B2
(45) Date of Patent: Oct. 5, 2010

(54) ADAPTER FOR THE ASSEMBLY OF A DOOR CONTROL MODULE TO A MOTOR VEHICLE DOOR

(75) Inventors: Gerhard Mersch, Uetze (DE); Jürgen Moser, Meine (DE)

(73) Assignee: ArvinMeritor GmbH, Dietzenbach (DE)

( * ) Notice: Subject to any disclaimer, the term of this patent is extended or adjusted under 35 U.S.C. 154(b) by 812 days.

(21) Appl. No.: 10/374,760

(22) Filed: Feb. 26, 2003

(65) Prior Publication Data

US 2003/0159360 A1 Aug. 28, 2003

(30) Foreign Application Priority Data

Feb. 26, 2002 (DE) .............................. 102 08 106

(51) Int. Cl.
*B60J 5/04* (2006.01)
(52) U.S. Cl. ........................................ 49/502; 049/349
(58) Field of Classification Search ................ 049/502, 049/348, 349, 352; 439/34, 210, 211, 213; 296/146.7
See application file for complete search history.

(56) References Cited

U.S. PATENT DOCUMENTS

| | | | | |
|---|---|---|---|---|
| 4,429,495 A | * | 2/1984 | Aoki | 49/501 |
| 4,800,648 A | | 1/1989 | Nakayama et al. | |
| 4,815,984 A | * | 3/1989 | Sugiyama et al. | 439/211 |
| 4,848,928 A | * | 7/1989 | Ausnit | 383/5 |
| 5,037,325 A | * | 8/1991 | Wirkus | 439/467 |
| 5,092,647 A | * | 3/1992 | Ueda et al. | 296/146.9 |
| 5,245,258 A | * | 9/1993 | Becker et al. | 318/266 |
| 5,487,680 A | * | 1/1996 | Yamanashi | 439/552 |
| 5,516,302 A | * | 5/1996 | Kim et al. | 439/210 |
| 5,651,683 A | * | 7/1997 | Shimamura et al. | 439/34 |
| 5,724,769 A | * | 3/1998 | Cripe et al. | 49/360 |
| 5,771,575 A | * | 6/1998 | Onizuka et al. | 29/868 |
| 5,971,791 A | * | 10/1999 | Itoh et al. | 439/364 |
| 6,095,855 A | * | 8/2000 | Iwata et al. | 439/553 |
| 6,159,019 A | * | 12/2000 | Norizuki et al. | 439/34 |
| 6,164,160 A | * | 12/2000 | Nassar | 74/606 R |
| 6,321,446 B1 | | 11/2001 | Iwata et al. | |
| 6,368,114 B1 | * | 4/2002 | Inoue | 439/34 |

(Continued)

FOREIGN PATENT DOCUMENTS

DE 37 40 578 1/1989

(Continued)

OTHER PUBLICATIONS

Austrian Search Report dated Mar. 12, 2002.

*Primary Examiner*—Gregory J. Strimbu
(74) *Attorney, Agent, or Firm*—Carlson, Gaskey & Olds

(57) ABSTRACT

An adapter received in an opening of a partition wall of a vehicle door connects a cable plug of a cable harness to a module plug of a door control module. The adapter includes a mount for the module plug, a mount for the cable plug, and an abutment face providing a seal at the partition wall. The adapter further includes a latching tab. When the adapter is inserted into the opening, the latching tab flexes outwardly, securing the adapter to the partition wall. The module plug and the cable plug can be inserted into or removed from the adapter without affecting the sealing between the wet area and the dry area of the vehicle door.

17 Claims, 7 Drawing Sheets

U.S. PATENT DOCUMENTS 6,574,922 B2 * 6/2003 Velthaus et al. .............. 49/352
2002/0046503 A1 * 4/2002 Mersch ....................... 49/502

FOREIGN PATENT DOCUMENTS

| | | |
|---|---|---|
| DE | 197 17 760 | 10/1998 |
| DE | 196 53 733 | 10/2000 |
| DE | 100 31 487 | 9/2002 |
| EP | 0 534 659 | 3/1993 |
| EP | 0 896 397 | 2/1999 |

* cited by examiner

ADAPTER FOR THE ASSEMBLY OF A DOOR CONTROL MODULE TO A MOTOR VEHICLE DOOR

This patent application claims priority to German Patent Application Number DE 102 08 106.9 filed on Feb. 26, 2002.

BACKGROUND OF THE INVENTION

The invention relates generally to a vehicle door module assembled in a vehicle door including an adapter received in an opening in a partition wall that separates a wet area from a dry area. The adapter connects a cable plug of a cable harness to a module plug of a door control module to power an assembly unit of a vehicle door that includes functional components, such as a window lifter motor or door lock. The adapter allows for assembly and disassembly of the door control module and the cable harness from the adapter.

A cable harness is employed to provide power to an assembly unit in a vehicle door that includes various functional components, such as a window lifter or a door lock. In the prior art, a cable plug of the cable harness is connected to a door control module to provide power to the assembly unit. German Patent Publication 196 53 733 discloses an electric plug connection between a door control module and a cable plug. The door control module is a simple circuit that is integrated in a plug connector. The plug connector is inserted in an opening in a partition wall of the vehicle door and includes latching tabs that non-releasably lock the plug connector to the partition wall. The cable plug is plugged into the plug connector on the opposing side of the partition wall. Seals at the interface of the plug connector and the opening in the partition wall provide sealing between the wet area and the dry area of the vehicle door.

A disadvantage to the vehicle door module of the prior art is that the door control module cannot be disassembled from the cable plug because the latching tabs non-releasably lock the plug connector in the opening of the partition wall, preventing removal of the plug connector from the partition wall. Therefore, the door control module cannot be removed from the partition wall.

There is a need in the art for a vehicle door module that allows the door control module to be removable from the partition wall.

SUMMARY OF THE INVENTION

A vehicle door module assembled in a vehicle door includes an adapter received in an opening of a partition wall of a vehicle door. The adapter connects a cable plug of a cable harness to a module plug of a door control module. The partition wall separates a dry area from a wet area. The adapter includes a mount for the module plug, a mount for the cable plug, and an abutment collar including a seal that presses against the partition wall when the adapter is received in the opening. The adapter provides a connection between the door control module and the cable harness to power an assembly unit of the vehicle door that includes various functional components, such as a window lifter motor or a door lock.

The adapter includes a skirt extending from the abutment face that defines an interior space. The module plug is received in a mount formed by the interior space, and the cable plug is received in a mount formed by an exterior surface of the skirt. The skirt further includes a latching tab adapted to lock the adapter in the opening of the partition wall. When the adapter is inserted in the opening of the partition wall, the latching tab presses inwardly. After the adapter is inserted in the opening, the flexible latching tab flex outwardly, locking the adapter in the opening in the partition wall.

The door control module and the abutment face of the adapter are located in the dry area of the vehicle door. The cable plug further includes a sealing layer. When the cable plug is attached to the adapter, the sealing layer creates a tight seal between the wet area and the dry area that is maintained even when the door control module is removed from the adapter.

As the adapter is secured in the opening in the partition wall by the latching tabs, the module plug and the cable plug can be inserted into or removed from the adapter without affecting the seal between the wet area and the dry area of the vehicle door. The module plug and the cable plug can also be easily assembled and disassembled for maintenance. For example, the door control module may be removed from the adapter without removing the cable plug from the adapter.

These and other features of the present invention will be best understood from the specification and drawings.

BRIEF DESCRIPTION OF THE DRAWINGS

FIG. 7 shows, in a section corresponding to the view of FIG. 6, a door control module fitted to the door, before the cable plug is plugged in;

DETAILED DESCRIPTION OF THE PREFERRED EMBODIMENT

Figure 1:
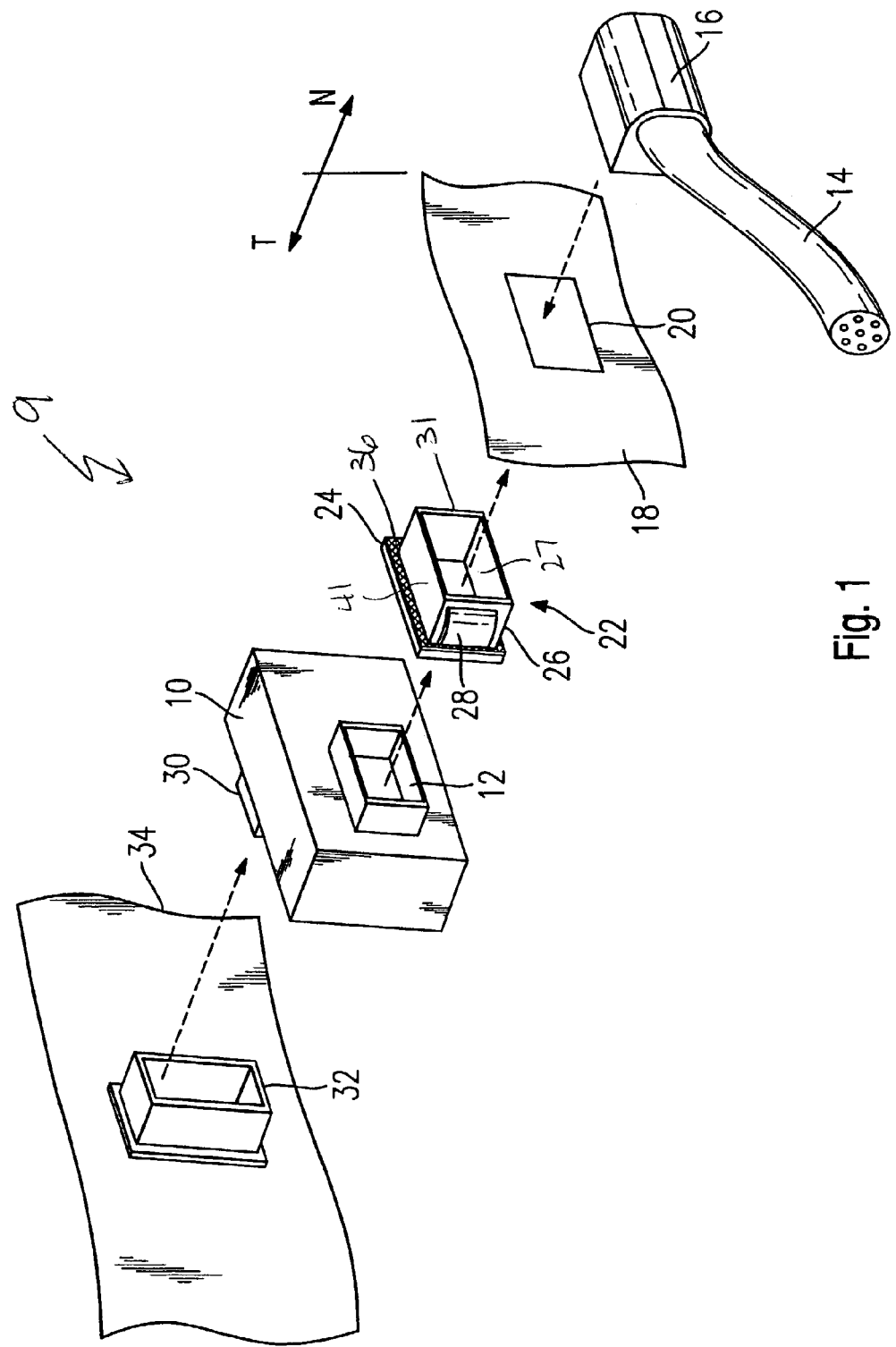
FIG. 1 shows a perspective exploded view of a door module in accordance with the invention.

FIG. 1 shows a vehicle door module 9 of a vehicle door including a door control module 10 employed to control a window lifter motor, a door lock, or other vehicle door functional component. The functional door components are part of an assembly unit 34. A module plug 12, shown schematically, is fitted to the door control module 10. In one example, the module plug 12 is integral with the door control module 10. However, it is to be understood that other types of attachment of the module plug 12 to the door control module 10 are possible, and the structure of the module plug 12 is not essential for understanding the invention. The module plug 12 connects the door control module 10 to a cable plug 16 of a cable harness 14 which provides power to the assembly unit 34.

The door control module 10 is installed inside a vehicle door, of which only a partition wall 18 is shown. The partition wall 18 divides the interior of the vehicle door into a dry area T and a wet area N. An adapter 22 including an abutment collar 24 and a skirt 26 defining a hollow interior space 27 is received in an opening 20 in the partition wall 18. The skirt 26 also has an exterior surface 41. The skirt 26 includes two flexible latching tabs 28 having free ends 29 located opposite the abutment collar 24. A seal 36 on the surface of the abutment collar 24 presses against the partition wall 18 and prevents leakage of moisture when the adapter 22 is received in the opening 20. The cable plug 16 and the module plug 12 are plugged into each other through the opening 20 in the partition wall 18.

A connector plug 30 is provided on the rear side of the door control module 10 facing away from the module plug 12. The connector plug 30 cooperates with a complementary connector plug 32 attached to the assembly unit 34. The assembly unit 34 includes various functional components, such as a window lifter motor or a door lock.

Figure 2:
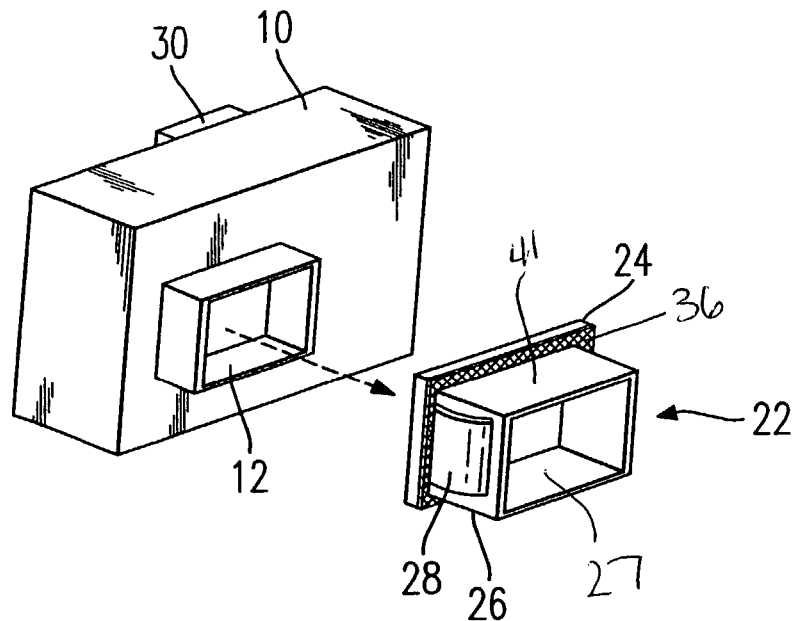
FIG. 2 shows a perspective view of a door control module including a module plug and an adapter.

FIG. 2 illustrates the assembly of the adapter 22 on the module plug 12 of the door control module 10. When assembled, the module plug 12 is received in the interior space 27 of the skirt 26 of the adapter 22. The interior space 27 defines the mount for the module plug 12, and the module plug 12 can be guided by the inner surface of the skirt 26.

Figure 3:
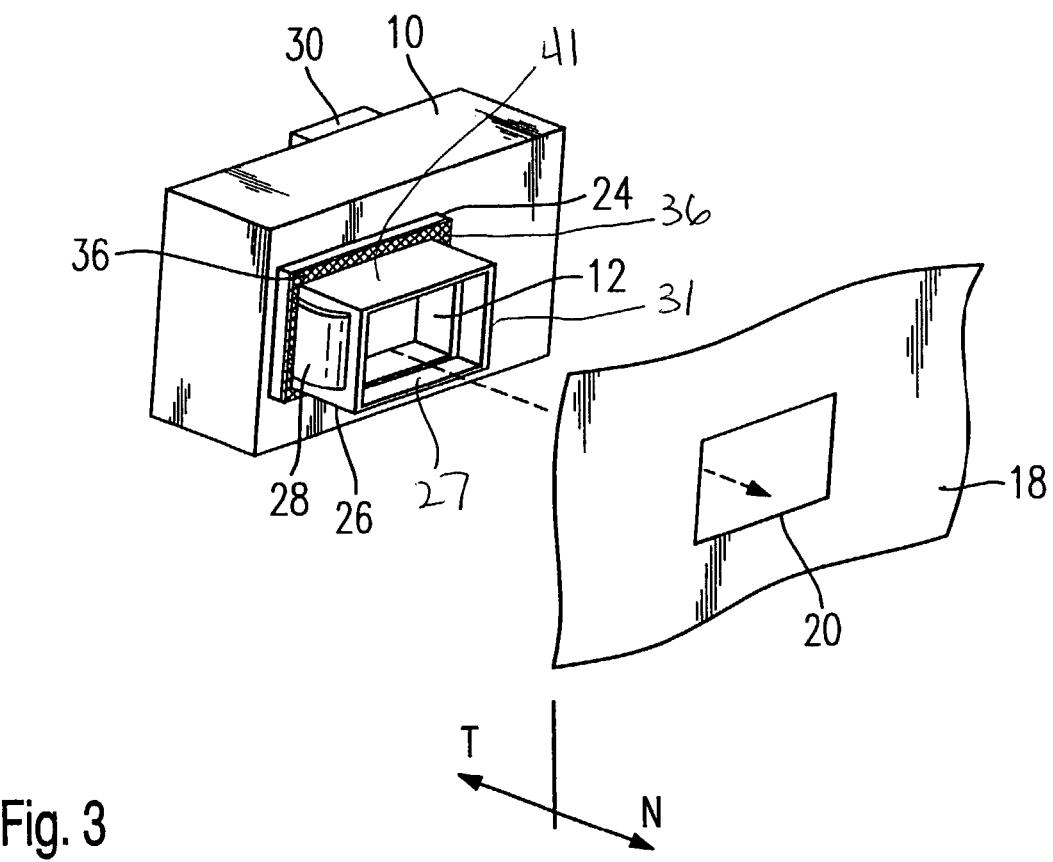
FIG. 3 shows a perspective view of a door control module with the adapter attached thereto, prior to installation of the door control module in the vehicle door.
Figure 6:
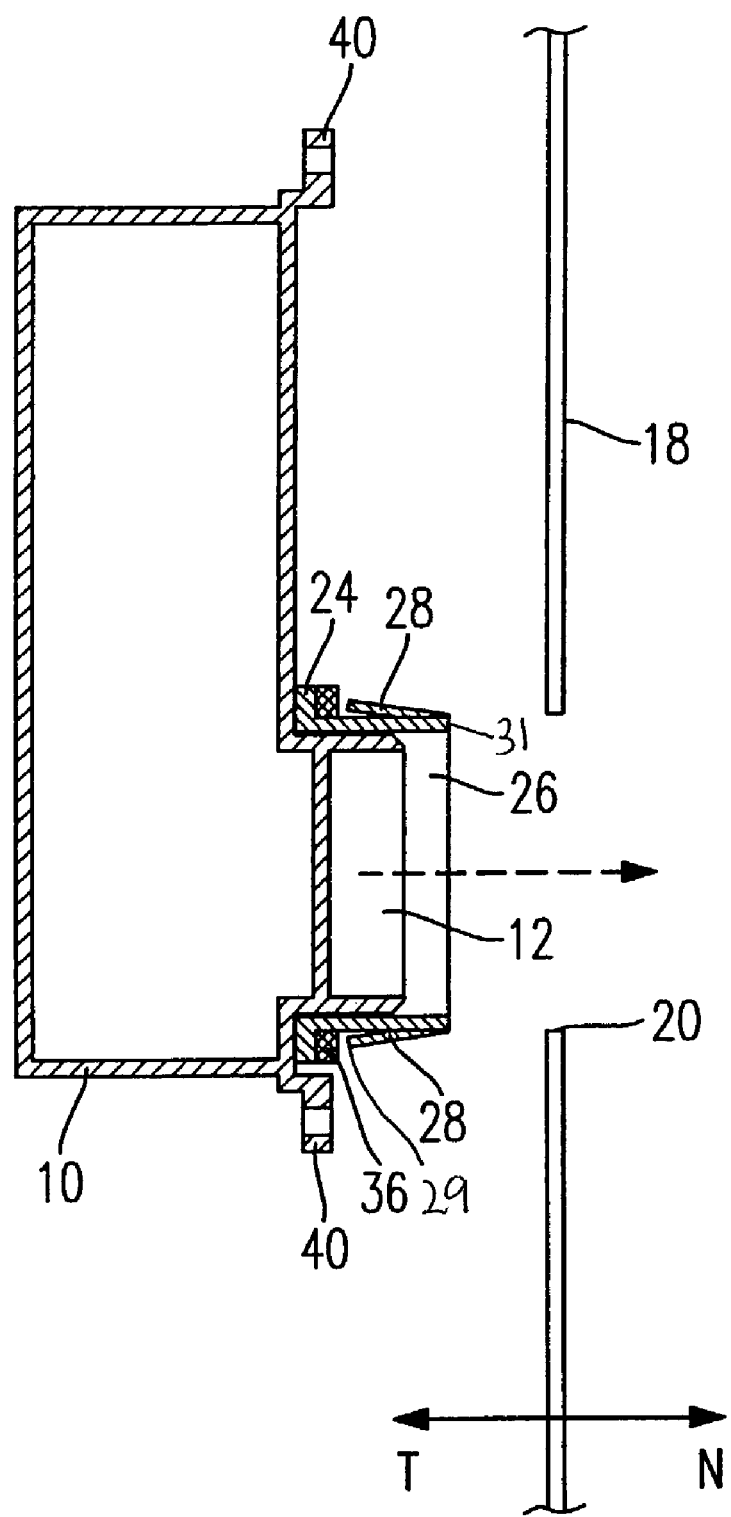
FIG. 6 shows a diagrammatic horizontal section through the door control module, prior to fitting at the vehicle door.

As shown in FIGS. 3 and 6, after assembly of the adapter 22 on the module plug 12, the adapter 22 is subsequently inserted into the opening 20 of the partition wall 18 from the dry area T of the partition wall 18.

Figure 4:
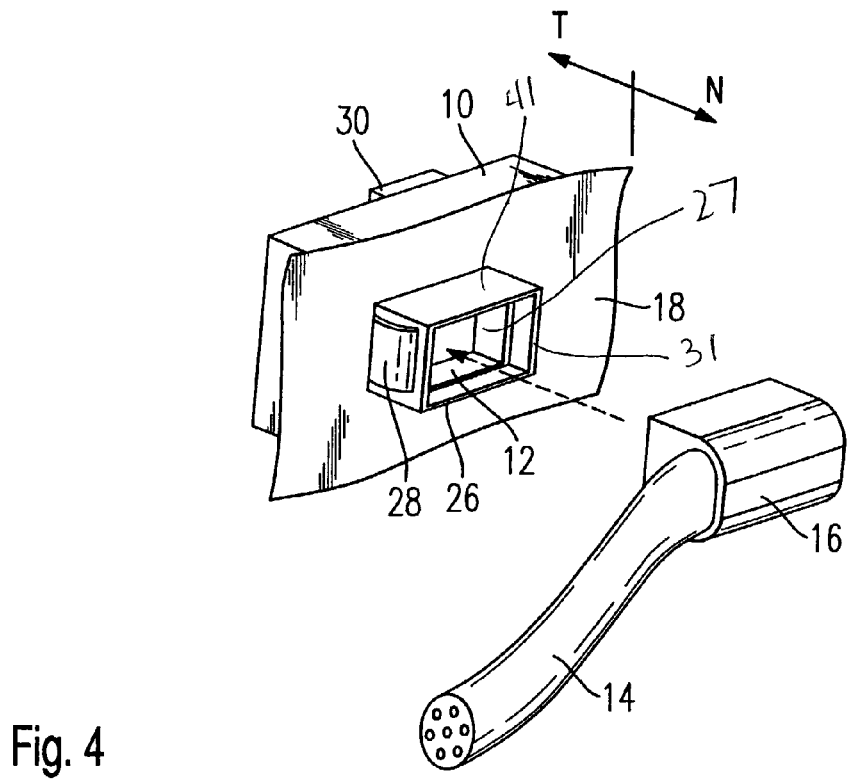
FIG. 4 shows a perspective view of the door control module fitted to the vehicle door, prior to attachment of the cable plug.
Figure 7:
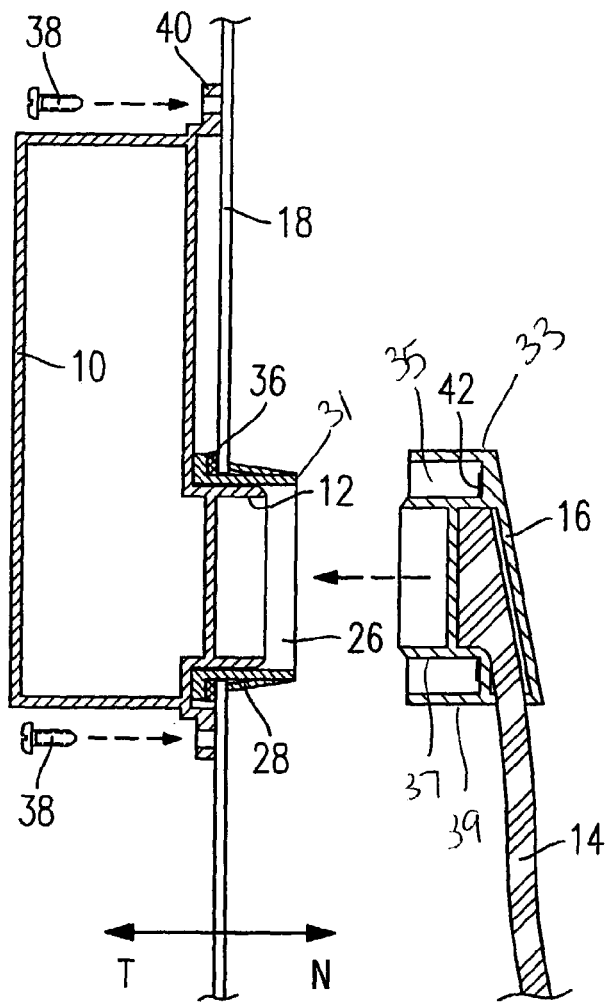
Figure 8:
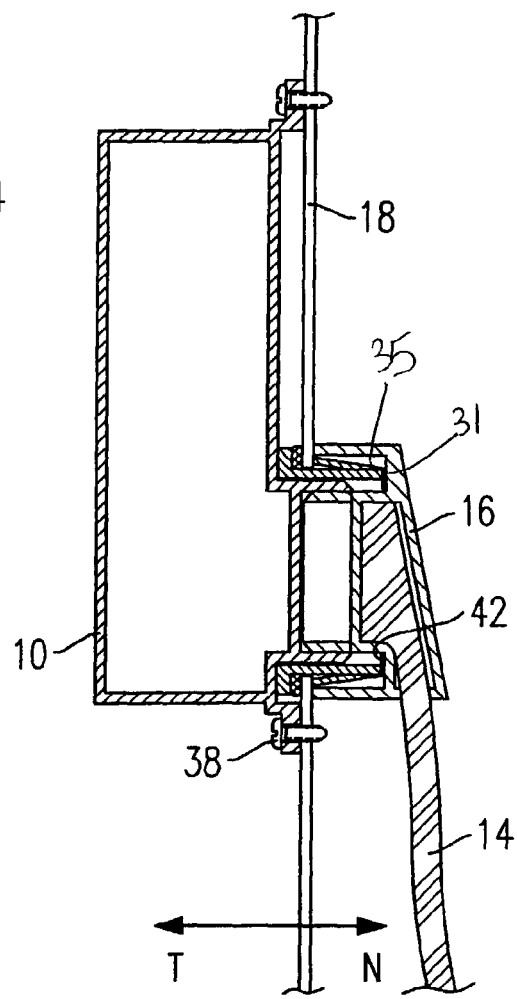
FIG. 8 shows, in a section corresponding to the view of FIG. 6, the door control module in the fully assembled condition.

When the skirt 26 of the adapter 22 is pushed through the opening 20 of the partition wall 18, the latching tabs 28 press against the skirt 26 of the adapter 22, allowing the skirt 26 of the adapter 22 to pass through the opening 20. As shown in FIGS. 4 and 7, the adapter 22 is pushed through the opening 20 until the abutment collar 24 rests against the partition wall 18. The latching tabs 28 flex outwardly, securing the adapter 22 firmly in place in the partition wall 18. The seal 36 pressed between the abutment collar 24 and the partition wall 18 provides sealing from moisture.

To ensure that all of the forces acting on the door control module 10 during operation are transferred to the partition wall 18 by the adapter 22, the door control module 10 is separately fastened to the partition wall 18 by at least one attachment member 38. The attachment member 38 extends through fastening brackets 40 on the door control module 10 and is received in the partition wall 18. In one example, the attachment member 38 is a screw. However, the attachment member 38 can be fastening clips or rivets.

After fitting the door control module 10 to the partition wall 18, the cable plug 16 of the cable harness 14 is plugged into the module plug 12 from the wet area N. The cable plug 16 includes a wall 33 having a unshaped cross section. The wall 33 includes an inner wall 37, an outer wall 39, a cavity 35 defined between the walls 37 and 39, and a sealing layer 42.

The cable plug 16 is received in a mount defined by the exterior surface 41 of the skirt 26. When the cable plug 16 is plugged into the module plug 12, the outer wall 33 of the cable plug 16 engages the skirt 26 of the adapter 22, which guides and mounts the cable plug 16. The sealing layer 42 provides a seal at the end face 31 of the skirt 26 of the adapter 22.

Figure 5:
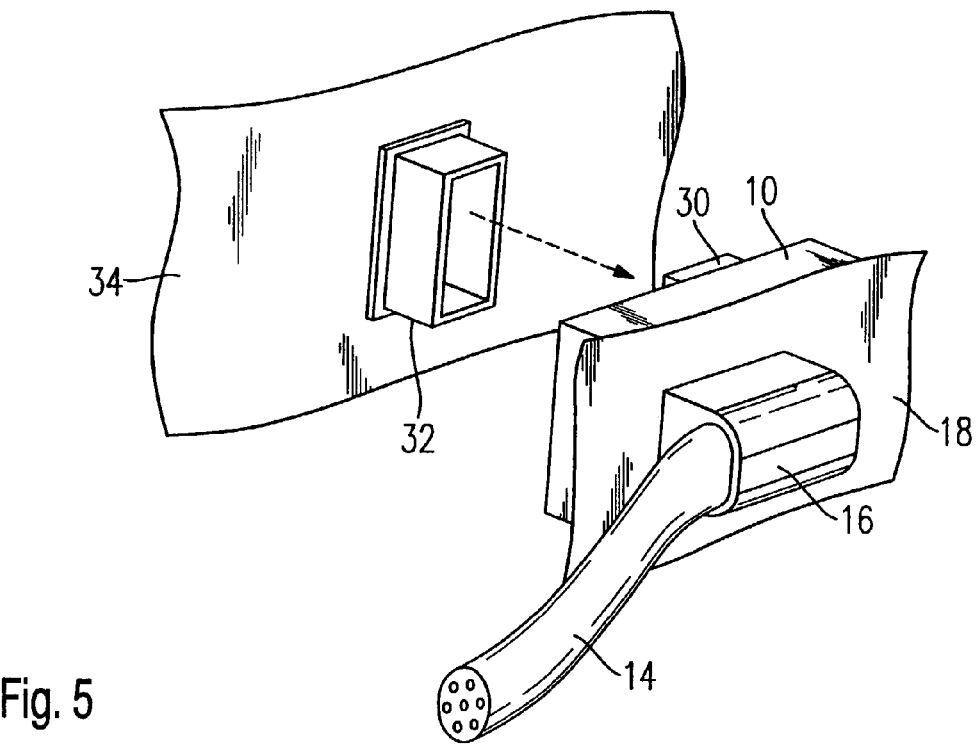
FIG. 5 shows a perspective view of the door control module fitted to the door, prior to installation of an assembly unit of the vehicle door.

Finally, as shown in FIG. 5, the connector plug 32 of the assembly unit 34 is plugged into the connector plug 30 of the door control module 10 from the side of the partition wall 18 facing away from the cable plug 16. Direct access to the connector plug 30 is not required, and therefore the assembly unit 34 can be mounted blindly.

Figure 9:
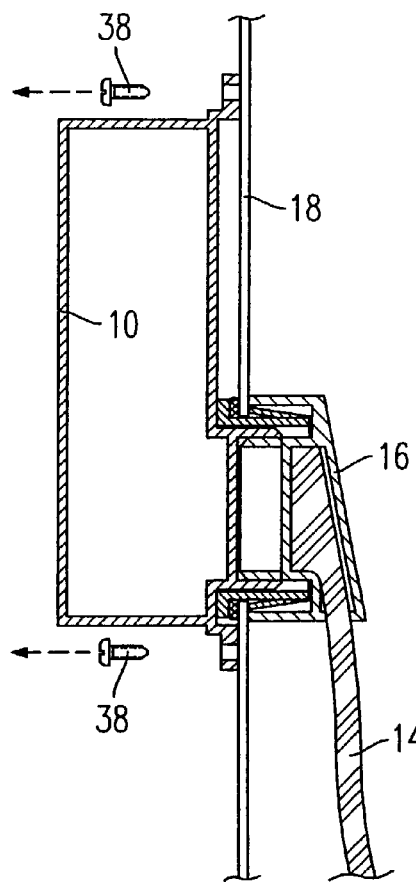
FIG. 9 shows, in a section corresponding to the view of FIG. 6, a first step for disassembling the door control module.
Figure 10:
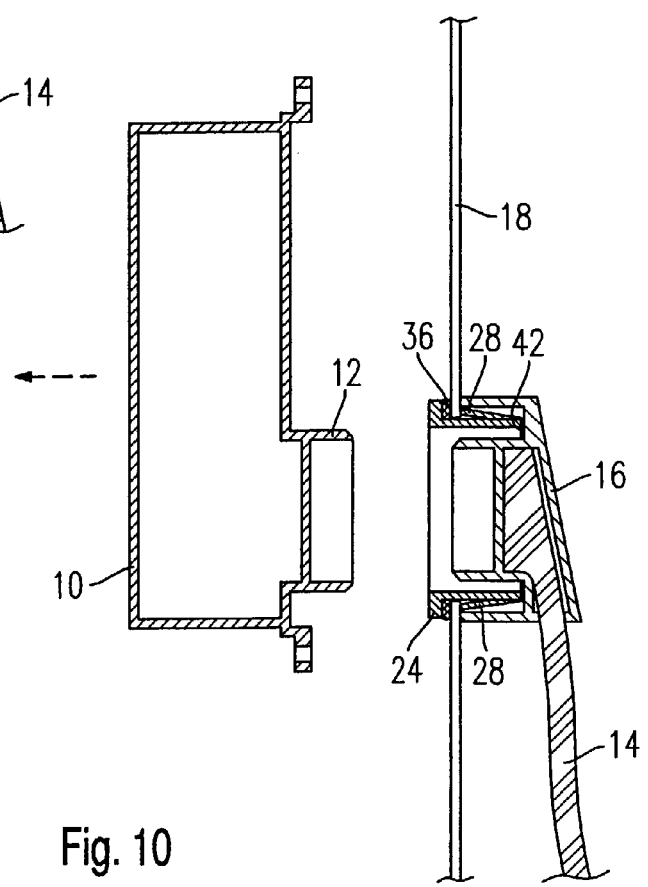
FIG. 10 shows, in a section corresponding to the view of FIG. 6, the door control module as withdrawn from the adapter.
Figure 11:
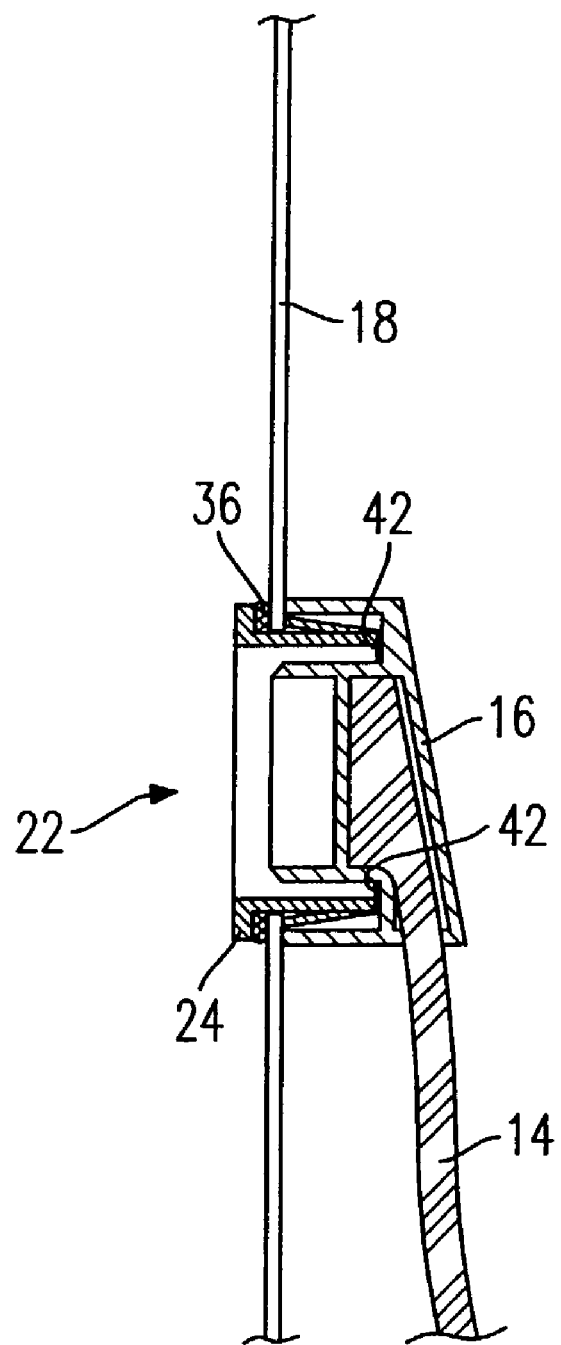
FIG. 11 shows, in a section corresponding to the view of FIG. 6, the door with the cable plug attached thereto, after removal of the door control module.

Since the cable plug 16 is received in the adapter 22 independently of the module plug 12, the door control module 10 can be disassembled without unplugging the cable plug 16. To remove the door control module 10, as shown in FIG. 9, the fastening member 38 is first removed. As shown in FIG. 10, the door control module 10 is then pulled out of the adapter 22. After the door control module 10 is removed, as shown in FIG. 11, the cable plug 16 remains in the adapter 22. The sealing layer 42 that contacts the end face 31 of the skirt 26 of the adapter 22 provides a seal from moisture when the door control module 10 is removed.

Alternately, the cable plug 16 can be unplugged without the module plug 12 or the door control module 10 being affected. When the cable plug 16 is unplugged, the module plug 12 remains in the adapter 22.

There are several advantages to the vehicle door module 9 of the present invention. For one, as the adapter 22 is secured to the partition wall 18 and not to the door control module 10, the door control module 10 or the cable harness 14 can be easily removed from the partition wall 18. Additionally, the seal 36 around the abutment collar 24 provides sealing between the wet area N and the dry area T. Additionally, the vehicle door module 9 including the adapter 22 is low cost.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle door comprising:
   a partition wall including an opening, wherein said partition wall separates a wet area of the vehicle door and a dry area of the vehicle door;
   an adapter including a module plug mount, a cable plug mount, and an abutment face, wherein said abutment face of said adapter seals said partition wall when said adapter is received in said opening, wherein said adapter includes a skirt extending from said abutment face, said skirt having an exterior surface and said skirt defining an interior space;
   a cable harness having a cable plug, wherein said cable plug is removably received in or around said cable plug mount; and
   a door control module having a module plug, wherein said module plug is removably received in said module plug mount, wherein said module plug is removable from said module plug mount when said cable plug is received in or around said cable plug mount, and wherein said exterior surface of said skirt defines said cable plug mount and said interior space of said skirt defines said module plug mount.

2. The vehicle door as recited in claim 1, further including an assembly unit having at least one functional component and a complementary plug, wherein said door control module includes a connector plug that cooperates with said complementary plug, and said door control module controls said assembly unit.

3. The vehicle door as recited in claim 2, wherein said at least one functional component is one of a window lifter motor and a door lock.

4. The vehicle door as recited in claim 1, wherein said skirt extends through said opening in said partition wall, and said cable plug includes a cable seal that seals at said skirt when said cable plug is received in or around said cable plug mount.

5. The vehicle door as recited in claim 1, wherein said module plug mount and said cable plug mount are separate.

6. The vehicle door as recited in claim 1, wherein said skirt includes at least one flexible latching tab adapted to lock said adapter in said opening of said partition wall.

7. The vehicle door as recited in claim 6, wherein said at least one flexible latching tab is moveable between an original position and a flexed position, and said at least one flexible latching tab flexes inwardly to said flexed position when said adapter is partially inserted into said opening of said partition wall, and said at least one flexible latching tab flexes outwardly from said flexed position to said original position after said adapter is completely inserted into said opening of said partition wall to retain said adapter in said opening of said partition wall.

8. The vehicle door as recited in claim 1, further including a seal on said abutment face, wherein said seal contacts said partition wall when said adapter is received in said opening of said partition wall.

9. The vehicle door as recited in claim 1, further including at least one attachment member and said door control module includes at least one fastening bracket, wherein said at least one attachment member is received in said at least one fastening bracket to secure said door control module to said partition wall.

10. The vehicle door as recited in claim 1, wherein said abutment face defines a plane, and said module plug mount and said cable plug mount are at least partially located on a common side of said plane.

11. The vehicle door as recited in claim 1, wherein said module plug is integral with said door control module.

12. A vehicle door comprising:
a partition wall having an opening, wherein said partition wall separates a wet area of the vehicle door from a dry area of the vehicle door;
an assembly unit including at least one functional component;
a door control module to control said assembly unit, wherein said door control module includes a module plug;
a cable harness including a cable plug; and
an adapter including a module plug mount, a cable plug mount, and an abutment face, wherein said abutment face seals said partition wall when said adapter is received in said opening, and said module plug is removably received in said module plug mount and said cable plug is removably received in or around said cable plug mount, and said module plug is removable from said module plug mount when said cable plug is received in or around said cable plug mount, wherein said adapter further includes a skirt extending from said abutment face, and said skirt has an exterior surface and said skirt defining an interior space, and wherein said exterior surface of said skirt defines said cable plug mount and said interior space of said skirt defines said module plug mount.

13. The vehicle door as recited in claim 12, wherein said skirt extends through said opening in said partition wall, and said cable plug includes a cable seal that seals at said skirt when said cable plug is received in or around said cable plug mount.

14. The vehicle door as recited in claim 12, wherein said skirt includes at least one flexible latching tab adapted to lock said adapter in said opening of said partition wall.

15. The vehicle door as recited in claim 12, further including a seal on said abutment face, wherein said seal contacts said partition wall when said adapter is received in said opening of said partition wall.

16. The vehicle door as recited in claim 12, further including at least one attachment member and said door control module includes at least one fastening bracket, and said at least one attachment member is received in said at least one fastening bracket to secure said door control module to said partition wall.

17. The vehicle door as recited in claim 12, wherein said abutment face defines a plane, and said module plug mount and said cable plug mount are at least partially located on a common side of said plane.

* * * * *